United States Patent [19]

van der Lely et al.

[11] 4,048,793
[45] Sept. 20, 1977

[54] RAKING MACHINE

[76] Inventors: Cornelis van der Lely, 7, Bruschenrain, Zug, Switzerland; Ary van der Lely, 10, Weverskade, Maasland, Netherlands

[21] Appl. No.: 653,730

[22] Filed: Jan. 30, 1976

Related U.S. Application Data

[62] Division of Ser. No. 514,309, Oct. 11, 1974.

[30] Foreign Application Priority Data

| Oct. 12, 1973 | Netherlands | 7314028 |
| Feb. 18, 1974 | Netherlands | 7402172 |
| Jan. 18, 1974 | Netherlands | 7400685 |
| June 19, 1974 | Netherlands | 7408181 |

[51] Int. Cl.² .......................................... A01D 77/05
[52] U.S. Cl. ........................................................ 56/370
[58] Field of Search ............................ 56/370, 192, 255

[56] References Cited

U.S. PATENT DOCUMENTS

| 2,489,059 | 11/1949 | Surgi | 56/192 |
| 3,105,341 | 10/1963 | Crump | 56/192 |

FOREIGN PATENT DOCUMENTS

| 2,431,366 | 6/1974 | Germany | 56/370 |

Primary Examiner—Russell R. Kinsey
Attorney, Agent, or Firm—Mason, Mason & Albright

[57] ABSTRACT

A raking machine has at least one rake head, which is rotatable about an upwardly extending axis of rotation. The or each rake head has crop displacing means mounted its perimeter and at least two crop guide members. A first guide member is located laterally of the working width of the rake head with respect to the direction of travel, the second guide member is located at least partly within the working width.

16 Claims, 2 Drawing Figures

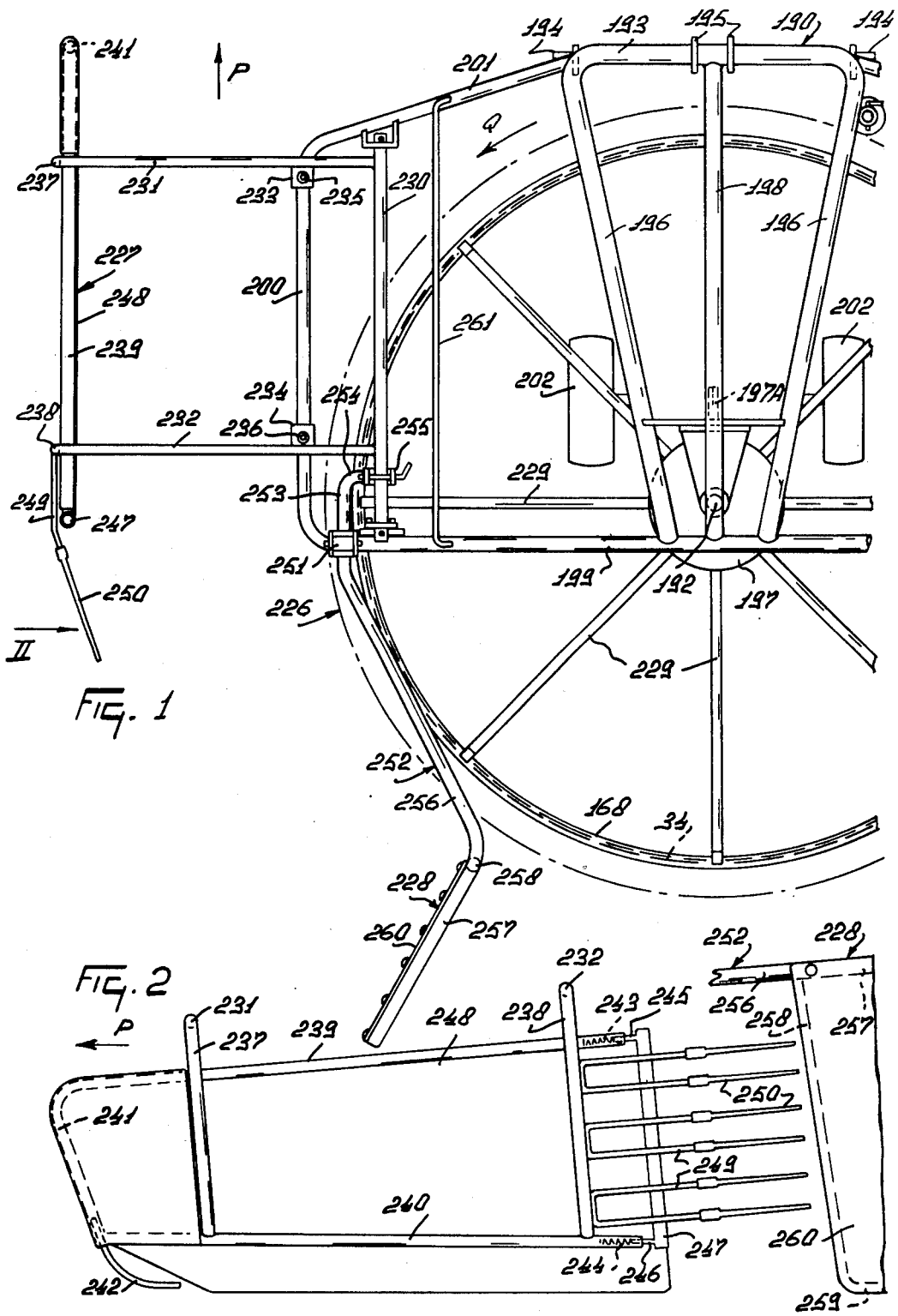

RAKING MACHINE

This application is a division of Ser. No. 514,309 filed Oct. 11, 1974.

This invention relates to a raking machine comprising a frame movable over the ground and at least one rake head supported on said frame, said rake head being rotatable about an upwardly extending axis of rotation and driving means connected to said head to rotate same, crop displacing means mounted around the perimeter of said rake head.

According to the invention there is provided a raking machine of the kind set forth, wherein at least two crop guide members are secured to said frame and positioned to form a swath or windrow of crop, a first guide member being located laterally of said rake head and its working width with respect to the normal direction of travel, a second guide member being positioned at least partly within said working width to the rear of said rake head.

For a better understanding of the invention, and to show how the same may be carried into effect, reference will now be made, by way of example, to the accompanying drawings, in which:

FIG. 1 is a plan view of the raking machine in accordance with the invention, and FIG. 2 is a schematic elevation as seen in the direction indicated by an arrow II in FIG. 1.

FIG. 1 of the drawings illustrates a raking machine having a frame 190 in which a single rake member 226 is mounted so as to be rotatable about a substantially vertical axis 192 that is actually so disposed that an upper region thereof is further advanced with respect to the intended direction of operative travel P of the machine than is a lower region thereof. However, the axis 192 may be very nearly truly vertically disposed in accordance with the particular construction that is adopted for the rake member 226 and the nature of the hay or other crop that is to be dealt with. The frame 190 has a coupling member or trestle 193 of substantially inverted U-shaped configuration at its front with respect to the direction P, said coupling member of trestle 193 incorporating lower substantially horizontally aligned fastening means 194 and upper fastening means 195 for connection to the three-point lifting device or hitch of a tractor. Tubular beams 196 converge rearwardly with respect to the direction P from the coupling member or trestle 193 as seen in the plan view of FIG. 1 and have their rearmost ends secured to the top of a gear box 197. The coupling member or trestle 193 and the two beams 196 define a truncated substantially isosceles triangle whose base is foremost with respect to the direction P and substantially perpendicular to that direction. Rotary drive is transmitted to the rake member 226 from the gear box 197 which has a forwardly projecting rotary input 197A whose leading splined or otherwise keyed end is intended to be placed in driven connection with the power take-off shaft of an operating tractor or other vehicle to whose three-point lifting device or hitch the coupling member or trestle is connected in the use of the machine by way of an intermediate telescopic transmission shaft of known construction having universal joints at its opposite ends. A tubular tie beam 198 has its leading end with respect to the direction P secured to the top of the coupling member or trestle 193 adjacent to the fastening means 195 and said beam extends downwardly and rearwardly with respect to the direction P to have its rearmost end also secured to the top of the gear box 197. It will be noted that, as seen in FIG. 1 of the drawings, the beam 198 coincides with a bisector of the apex angle of the previously mentioned truncated triangle that is afforded by the parts 193 and 196.

A beam 199 that extends substantially horizontally perpendicular to the direction P has a central region secured to the top of the gear box 197 and also to the rear ends of the tubular beams 196 and 198. The length of the beam 199 is slightly greater than the diameter of the rake member 226 and its opposite ends, that project laterally beyond the rake member 226, are bent forwardly through substantially 90° to merge into tubular wing beams 200 (one at each side of member 226) that both extend forwardly from the beam 199 in substantially parallel relationship with the direction P. The leading ends of the two wing beams 200 are each bent through less than 90° to form tubular supports 201 that converge forwardly with respect to the direction P and that have their leading ends fastened to lower regions of the coupling member or trestle 193 close to the fastening means 194. The parts 199, 200 and 201 can be formed integrally by suitably shaping a single tubular beam and it will be apparent from FIG. 1 of the drawings that, together, they afford protective brackets that lie above the rake member 226 and shield that rake member from contact with personnel, upright obstacles and so on.

The axis of rotation 192 is also the longitudinal axis of a stationary upright shaft whose lower end has a pair of horizontally aligned ground wheels 202 indirectly connected to it. The two ground wheels 202 are substantially symmetrical with respect to a vertical plane that extends in the direction P and that contains the axis 192. The mounting of the ground wheels 202 is, however, such that their points of contact with the ground surface are disposed in front of a vertical plane that is perpendicular to the direction P and that contains the point of intersection of the axis 192 with the ground surface. The ground wheels 202 are upwardly and downwardly adjustable relative to the frame 190 in a manner which may be known per se and which is not illustrated in the drawings but it is noted that this adjustability enables the inclination of the rake member 226 to the ground surface to be adjusted to, and maintained in, a desired setting.

The left-hand wing beam 200 with respect to the direction P serves also, in this embodiment, as a support for a swath board 227 that is located at the left-hand side of the rake member 226. The left-hand end of the transverse beam 199 also serves, in this embodiment, as a support for a second beard 228. The rake member 226 has a hub (not visible) that is rotatable about the axis 192 and from which a plurality, such as eight, of spokes 229 extends outwardly at regular angular intervals around said axis and in radial directions as viewed lengthwise of that axis. The inner ends of the spokes 229 are rigidly secured to the hub that has just been mentioned while the outer ends thereof rigidly support ring 168 from which the upper edge of a flexible wall 34 is suspended, said wall being provided with a plurality of the groups of tines which are not actually illustrated but whose presence is denoted by a broken line which indicates the circular figure traced by the free ends or tips of the tines.

A tubular shaft 230 is pivotally connected by bearing brackets to the left-hand tubular support 201 and to the left-hand end of the transverse beam 199 in such a way that said tubular support 230 extends substantially horizontally parallel to the left-hand wing beam 200. As viewed in plan (FIG. 1), the longitudinal axis of the shaft 230 intersects the circular tine tip path (shown by a broken line and mentioned above) at two points that are both close to the left-hand side of the rake member 226. Two supports 231 and 232 have their ends secured to the shaft 230 near the leading end of that shaft and towards the rearmost end thereof, respectively, said supports 231 and 232 both extending perpendicular to the shaft 230 in relatively parallel relationship. When the machine is employed with the swath board 227 in an operative position, the supports 231 and 232 are substantially horizontally disposed and extend laterally from the frame 190 and outwards away from the rake member 226. The supports 231 and 232 are provided with corresponding stops 233 and 234 which can bear downwardly on the underlying left-hand wing beam 200. The stops 233 and 234 incorporate set bolts 235 and 236 respectively and these set bolts can be adjusted to alter the angular positions of the supports 231 and 232 that exist when the stops 233 and 234 come into contact with the wing beam 200.

The ends of the tubular supports 231 and 232 that are remote from the shaft 230 are bent over downwardly through substantially 90° to form holders 237 and 238 whose upright lengths are equal to substantially 70% of the lengths of the supports 231 and 232 themselves. The holders 237 and 238 are interconnected, near their upper ends and at their lower ends, by substantially horizontally disposed tubular tie beams 239 and 240, the upper beam 239 being prolonged forwardly in front of the holder 237 with respect to the direction P to form a leading beam 241 that is bent over downwardly through substantially 110°. The lower end of the downwardly bent over leading beam 241 is secured to the front end of an axially forward extension of the lower tie beam 240. A shoe or skid 242 projects downwardly from the lowermost end of the leading beams 241 and is curved rearwardly with respect to the direction P so as to extend parallel to the tie beam 240 for sliding contact with the crop and/or with the ground surface.

The tie beams 239 and 240 are also extended behind the holder 238 with respect to the direction P, the open rear ends of the tubular beams 239 and 240 receiving helical compression springs 243 and 244 respectively whose internal ends bear against plugs within beams 239 and 240 that are not illustrated in the drawings. Upper and lower pins 245 and 246 are entered telescopically in the open ends of the tie beam extensions and bear against the rearmost ends of the springs 243 and 244. The two pins 245 and 246 are carried by an upright stretcher 247 that is substantially parallel to the holders 237 and 238. A framework is formed by the tie beams 239 and 240, the leading beams 241 and the stretcher 247 and that framework is covered on the side thereof that is closest to the rake member 226 by a screen 248 of flexible material such as oilcloth or the like. The screen 248 is held around the tie beam 239, the leading beam 241 and the stretcher 247 by stitching that is not shown in the drawings, the springs 243 and 244 causing the stretcher 247 to maintain the screen 248 in a taut condition in the direction P. The screen 248 includes a flap which extends downwardly below the lower tie beam 240 to an extent such that its lowermost edge normally bears the ground surface behind the shoe or skid 242. This allows the swath board 227, when it is in use, to follow undulations in the ground surface by sliding thereover, said swath board being turnable upwardly and downwardly relative to the frame 190 about the axis of the pivotally mounted tubular shaft 230.

A plurality, such as six, of guide rods 249 extend rearwardly from the holder 238 with respect to the direction P in perpendicular relationship with that holder. The guide rods 239 are equally apart from one another and, as will be clear from FIG. 2 of the drawings, are preferably, but not essentially, formed in integral pairs from single lengths of spring steel or other rod material. Each rod 249 is bent behind the stretcher 247 with respect to the direction P towards the rake member 226 in such a way that the bent rear ends are contained in a substantially vertical plane that is inclined at an angle of substantially 20° to a substantially vertical plane containing the longitudinal axes of the tie beams 239 and 240, the leading beam 241 and the stretcher 247. The bent over rearmost ends of the guide rods 249 are extended rearwardly by further straight synthetic plasticsrods 250 having sockets at their leading ends that frictionally engage the guide rods 249.

The swath board 227 is perpendicularly spaced from the nearest point on the rake member 226 by a distance which is equal to substantially 70% of the radius of that rake member and, as viewed in side elevation (FIG. 2), most of it is in front of the axis of rotation 192 with respect to the direction P. A sleeve 251 is welded or otherwise rigidly secured to the transverse beam 199 closely adjacent to the bend by which that beam is integrally connected to the wing beam 200 and a tubular support 252 is pivotably connected to the sleeve 251. The support 252 includes a portion 253 that extends forwardly, as viewed in plan (FIG. 1), from the beam 199 in perpendicular relationship therewith, the leading end of said portion 253 being bent over through substantially 90° in a direction away from the swath board 227 to form a latching portion 254. The latching portion 254 carries a U-shaped bracket 255 whose limbs are disposed at opposite lateral sides of the tubular shaft 230 but whose extents are such that they project vertically above that shaft. A substantially horizontal locking pin is provided for entry through aligned holes in the limbs of the bracket 255, above the shaft 230, to latch the second swath board 228 effectively, but not fixedly, to said shaft 230 when required.

The tubular support 252 can turn upwardly and downwardly about a pivotal shaft relative to the sleeve 251. The pivotal shaft which has just been mentioned defines an axis that is substantially parallel to the beam 199 and forms the principal member of the pivotal connection between the support 252 and the sleeve 251. The support 252 is bent over, behind the sleeve 251, towards the rake member 226 to form a supporting portion 256 whose longitudinal axis is inclined to that of the portion 253, at least as seen in FIG. 1 of the drawings, by an angle of substantially 30°. The length of the supporting portion 256 is equal to substantially 80% of the radius of the rake member 226. The rear end of the supporting portion 256 with respect to the direction P is bent away from the rake member 226 through an angle of substantially 60° to form a further supporting portion 257 whose length is equal to substantially 60% of the radius of the rake member 226. A tubular beam 258 extends substantially perpendicularly downwards from the further supporting portion 257 at a location close to the junction of that portion with the portion 256, said tubular beam 258 having a length which is approximately equal to that of the further supporting portion 257. The lower end of the tubular beam 258 is bent over rearwardly through substantially 90° to form a beam 259 which terminates, as viewed in plan (FIG. 1), substantially vertically beneath the free rearmost end of the further supporting portion 257. Most of the further supporting portion 257 that is located rearwardly of the tubular beam 258, the tubular beam 258 itself and the beam 259 are covered at the sides thereof that face the swath board 227 by a screen 260 formed from, for example, a sheet of canvas or rubber. The swath board 228 that is afforded principally by the screen 260 and the parts which immediately support that screen is inclined at an angle of substantially 30° to the direction P as viewed in plan (FIG. 1).

In the use of the machine the wall 34 of the rake member 226 and its tines will display hay or other crop in the direction Q and, simultaneously, in a direction contrary to the direction P. The hay or other crop is shed from the rake member in a region thereof that is generally to the left of the foremost point of said rake member with respect to the direction P so that the ejected crop is thrown towards the swath board 227 which swath board, of course, also moves forwardly with the frame 190 in the direction P. At least some of the crop will also be contacted, and laterally displaced, by the rearmost ends of the forwardly moving guide rods 249 and the synthetic plastic rods 250. The result is to push the swath or window of crop that is formed a short distance back towards the rake member 226 and it tends to remain in the position to which it is pushed without irregular bulging due to the resilience of the rods 249 and 250 and the low frictional resistance of their crop-contacting surfaces. The side of the swath or windrow of crop that has been formed that is nearest to the member 226 is contacted by the second swath board 228 shortly after the first swath board 227 has ceased to affect the swath or windrow to any significant extent because, as will be evident from FIG. 1 of the drawings, the second swath board 228 is located substantially wholly to the rear of the first swath board 227 with respect to the direction P. The second swath board 228 is located at least partly to the right, as seen in FIG. 1 of the drawings with respect to the direction P, of a tangential line (parallel to the direction P) to the broken line in FIG. 1 that indicates the path of rotation of the tips of the tines of the member 226 at the left-hand side of that member. The second swath board shapes the adjacent side of the formed swath or windrow of crop and brings it to the desired sloping configuration but also functions to scrape from the ground and collect into said swath or window any small quantities of hay or other crop that have been carried round the axis 192 too far in the direction Q by the rake member 226.

The swath board 227 slides over the ground surface by way of its leading show or skid 242 and can thus follow undulations that it may meet, it being remembered that the whole swath board is turnable and downwardly relative to the frame 190 about the axis of the tubular shaft 230. The second shaft board 228 slides over the ground on the beam 259 and can turn upwardly and downwardly about the axis of the sleeve 251 to match ground undulations, the limbs of the bracket 255 also moving upwardly and downwardly at the opposite sides of the shaft 230. When the three-point lifting device or hitch of the operating tractor or other vehicle is raised to lift the machine clear of contact with the ground, the first swath board 227 turns downwardly about the axis of the shaft 230 until the stops 233 and 234 meet the wing beam 200. The second swath board 228 turns downwardly about the axis of the sleeve 251 until the base of the bracket 255 bears against the lower surface of the shaft 230. In order to bring the machine to a transport position in which its lateral width and rearward extent are reduced as compared with a working position of the machine, the swath board 227 is first turned upwardly through substantially 180° about the axis of the shaft 230 until the supports 231 and 232 bear against a stop bracket 261 that extends substantially parallel to the direction P between the beam 199 and the left-hand tubular support 201. The locking pin interconnecting the limbs of the bracket 255 is removed and the second swath board 228 is turned upwardly through substantially 180° about the axis of the sleeve 251 to bring it to a forwardly displaced inverted position in which the supporting portion 256 of the tubular support 252 bears downwardly on the stop bracket 261.

What we claim is:

1. A raking machine comprising a frame movable over the ground and at least one rake member supported on said frame, said rake member being rotatable about an upwardly extending axis of rotation to define a working width and driving means connected to said member to rotate same, crop displacing tine means mounted around the perimeter of said rake member, first and second guide members connected to said frame and being positioned to form a swath of crop to one side to the rake member, the first guide member being positioned laterally of the working width of said rake comprising elongated screen means that extends in the general direction of travel of said machine, the second guide member being positioned to the rear of said first guide member and adjacent the working width of the rake member to the rear thereof, said guide members being laterally spaced apart from one another and positioned to confine the displaced crop received from the rake head at said one side into a swath between the guide members.

2. A machine as claimed in claim 1, wherein a front portion of the second crop is located at least partly within said working width and that member comprises a screen that extends rearwardly and substantially beyond the perimeter of said rake member.

3. A machine as claimed in claim 2, wherein said guide members converge towards one another rearwardly with respect to the direction of normal travel.

4. A machine as claimed in claim 3, wherein, as seen in side elevation, the screen of said second guide member is located to the rear of the leading end of said screen means.

5. A machine as claimed in claim 3, wherein a part of said screen extends in line with the working width path of said rake member to the rear of said crop displacing means. during operative travel.

6. A machine as claimed in claim 5, wherein as least one of said guide members comprises an upwardly extending surface and a plurality of substantially parallel resilient rods extend rearwardly from said one guide member.

7. A machine as claimed in claim 6, wherein said rod extend substantially horizontally and project freely to the rear in inclined relationship with the general plane of said surface.

8. A machine as claimed in claim 6, wherein, viewed in a direction perpendicular to the general plane of said surface, said rods are fixed at points located within that surface.

9. A machine as claimed in claim 8, wherein said surface is stretchable.

10. A machine as claimed in claim 9, wherein said surface is secured to a framework, a part of which is resiliently displaceable relative to the remainder of the framework.

11. A machine as claimed in claim 10, wherein said framework comprises tubular beams and one of said beams is telescopic within other beams of the framework, said one beam being spring urged away from the other beams to stretch said surface.

12. A machine as claimed in claim 6, wherein said one guide member corresponds to the first guide member and the second guide member comprises an upwardly extending screen that is inclined to the surface of the first guide member when viewed in plan.

13. A machine as claimed in claim 1, wherein said guide members are each pivoted to the frame and positioned to slide over the ground during travel, said guide members being freely pivotable in vertical directions to match ground undulations.

14. A machine as claimed in claim 13, wherein said firs guide member is pivotable about an axis that extends substantially parallel to the direction of travel.

15. A machine as claimed in claim 14, wherein said second guide member is pivoted about an axis that extends substantially perpendicular to the direction of travel.

16. A machine as claimed in claim 1, wherein said second guide member includes a support and a first forward portion of said support extends substantially tangential to the rake member, a second trailing portion of said support extending towards said first guide member and at an angle to the first forward portion, an upwardly extending screen being mounted on said second portion.

* * * * *